US008547836B2

(12) United States Patent
Feder et al.

(10) Patent No.: US 8,547,836 B2
(45) Date of Patent: *Oct. 1, 2013

(54) DEVICE, METHOD AND SYSTEM OF DUAL-MODE WIRELESS COMMUNICATION (75) Inventors: Meir Feder, Herzliya (IL); Lior Ophir, Herzlia (IL)

(73) Assignee: Amimon Ltd., Herzlia (IL)

( * ) Notice: Subject to any disclaimer, the term of this patent is extended or adjusted under 35 U.S.C. 154(b) by 126 days.

This patent is subject to a terminal disclaimer.

(21) Appl. No.: 12/923,419

(22) Filed: Sep. 21, 2010

(65) Prior Publication Data

US 2011/0075644 A1    Mar. 31, 2011

Related U.S. Application Data (63) Continuation of application No. 11/868,499, filed on Oct. 7, 2007, now Pat. No. 7,852,818.

(60) Provisional application No. 60/828,561, filed on Oct. 6, 2006.

(51) Int. Cl.
*G08C 15/00* (2006.01)
*H04L 1/00* (2006.01)
*H04L 12/26* (2006.01)
*H04W 4/00* (2009.01)
*H04B 1/18* (2006.01)

(52) U.S. Cl.
USPC ......... 370/230; 370/252; 370/334; 455/168.1

(58) Field of Classification Search
None
See application file for complete search history.

(56) References Cited

U.S. PATENT DOCUMENTS

| 5,768,535 | A | 6/1998 | Chaddha et al. |
| 6,535,239 | B1 | 3/2003 | Kim |
| 6,788,349 | B2 | 9/2004 | Wu et al. |
| 6,871,081 | B1 | 3/2005 | Llewellyn et al. |
| 6,957,067 | B1 | 10/2005 | Iyer et al. |
| 7,046,716 | B1 * | 5/2006 | Miao ............................. 375/130 |
| 7,269,403 | B1 | 9/2007 | Miao |
| 8,099,047 | B2 * | 1/2012 | David et al. .................. 455/41.2 |
| 2002/0003507 | A1 | 1/2002 | Dodge |
| 2003/0002582 | A1 | 1/2003 | Obrador |
| 2004/0125778 | A1 | 7/2004 | Lin et al. |

(Continued)

FOREIGN PATENT DOCUMENTS

| JP | 2004/289756 | 10/2004 |
| WO | WO2005/029737 | 3/2005 |
| WO | WO2006/101801 | 9/2006 |
| WO | WO2006/118964 | 11/2006 |

OTHER PUBLICATIONS

International Search Report of PCT/IL07/01203 dated May 21, 2008.

*Primary Examiner* — Chirag Shah
*Assistant Examiner* — Asjley Shivers
(74) *Attorney, Agent, or Firm* — Eitan, Mehulal & Sadot (57) ABSTRACT

Some demonstrative embodiments include devices, systems and/or methods of dual-mode wireless communication. Some embodiments include a wireless dual-mode transceiver capable of operating at first and second wireless communication modes during first and second time periods, respectively, wherein at the first communication mode the transceiver is capable of performing wireless-local-area-network communications over a wireless-local-area-network link, and wherein at the second communication mode the transceiver is capable of performing wireless video communications over a wireless video communication link. Other embodiments are described and claimed.

16 Claims, 5 Drawing Sheets (56) References Cited

U.S. PATENT DOCUMENTS

| | | |
|---|---|---|
| 2004/0196404 A1 | 10/2004 | Loheit et al. |
| 2004/0196920 A1 | 10/2004 | Loheit et al. |
| 2004/0198420 A1 | 10/2004 | He et al. |
| 2004/0213262 A1 | 10/2004 | Choi |
| 2004/0264397 A1 | 12/2004 | Benveniste |
| 2005/0147071 A1* | 7/2005 | Karaoguz et al. ............. 370/338 |
| 2005/0188407 A1 | 8/2005 | Van Beek et al. |
| 2006/0052113 A1 | 3/2006 | Ophir et al. |
| 2006/0062195 A1 | 3/2006 | Gervais et al. |
| 2006/0063560 A1* | 3/2006 | Herle ......................... 455/552.1 |
| 2006/0094390 A1 | 5/2006 | Pan et al. |
| 2006/0095942 A1 | 5/2006 | Van Beek |
| 2006/0112414 A1 | 5/2006 | Ikonen et al. |
| 2006/0150222 A1 | 7/2006 | McCafferty et al. |
| 2006/0203758 A1 | 9/2006 | Tee et al. |
| 2006/0209745 A1 | 9/2006 | MacMullan et al. |
| 2006/0209890 A1 | 9/2006 | MacMullan et al. |
| 2006/0209892 A1 | 9/2006 | MacMullan et al. |
| 2006/0212911 A1 | 9/2006 | MacMullan et al. |
| 2007/0098063 A1 | 5/2007 | Reznic et al. |
| 2007/0142098 A1* | 6/2007 | Behzad et al. ................ 455/574 |
| 2008/0062919 A1* | 3/2008 | Chen et al. .................... 370/329 |
| 2008/0069065 A1* | 3/2008 | Wu et al. ....................... 370/340 |

* cited by examiner

DEVICE, METHOD AND SYSTEM OF DUAL-MODE WIRELESS COMMUNICATION

CROSS-REFERENCE

The present application is a Continuation of U.S. application Ser. No. 11/868,499, which was filed in the U.S. Patent and Trademark Office on Oct. 7, 2010 which claims the benefit of U.S. Provisional Patent application 60/828,561, which was filed in the U.S. Patent and Trademark Office on Oct. 6, 2006, the entire disclosure of which is incorporated herein by reference.

FIELD

Some embodiments relate generally to the filed of wireless communication and, more particularly, to dual-mode wireless communication including video and/or audio information.

BACKGROUND

Wireless communication has rapidly evolved over the past decades. Even today, when high performance and high bandwidth wireless communication equipment is made available there is demand for even higher performance at a higher data rates, which may be required by more demanding applications.

Video signals may be generated by various video sources, for example, a computer, a game console, a Video Cassette Recorder (VCR), a Digital-Versatile-Disc (DVD), or any other suitable video source. In many houses, for example, video signals are received through cable or satellite links at a Set-Top Box (STB) located at a fixed point.

In many cases, it may be desired to place a screen or projector at a location in a distance of at least a few meters from the video source. This trend is becoming more common as flat-screen displays, e.g., plasma or Liquid Crystal Display (LCD) televisions are hung on a wall. Connection of such a display or projector to the video source through cables is generally undesired for aesthetic reasons and/or installation convenience. Thus, wireless transmission of the video signals from the video source to the screen is preferred.

SUMMARY

Some demonstrative embodiments include systems and/or methods of dual-mode wireless-video communication.

Some demonstrative embodiments include a wireless dual-mode transceiver capable of operating at first and second wireless communication modes during first and second time periods, respectively, wherein at the first communication mode the transceiver is capable of performing wireless-local-area-network communications over a wireless-local-area-network link, and wherein at the second communication mode the transceiver is capable of performing wireless video communications over a wireless video communication link.

In some demonstrative embodiments, the wireless-local-area-network link may include a communication link over a first frequency band, and the wireless video communication link may include a communication link over a second frequency band different than the first frequency band.

In some demonstrative embodiments, the wireless dual-mode transceiver is capable of performing the wireless-local-area-network communications with a wireless-local-area-network access point, and performing the wireless video communications with a wireless video receiver.

In some demonstrative embodiments, the wireless dual-mode transceiver is capable of indicating to the access point a power save mode during at least part of the second time period.

In some demonstrative embodiments, the wireless dual-mode transceiver may include a radio-frequency module capable of performing the wireless-local-area-network and the wireless video communications; and at least one base-band module capable of handling wireless-local-area-network signals of the wireless-local-area-network communications and wireless-video signals of the wireless-video communications.

In some demonstrative embodiments, the at least one base-band module may include a wireless-local-area-network base-band module capable of handling the wireless-local-area-network signals; and a wireless-video base-band module capable of handling the wireless-video signals.

In some demonstrative embodiments, the wireless-local-area-network base-band module is capable of operating at a power save mode during at least part of the second time period.

In some demonstrative embodiments, the wireless dual-mode transceiver is capable of adjusting at least one of the first and second time periods based on a criterion related to at least one of the wireless-local-area-network communications and the wireless-video communications.

In some demonstrative embodiments, the wireless dual-mode transceiver is capable of adjusting at least one of the first and second time periods based on at least one of a throughput of the wireless-local-area-network communications, and a video format of the wireless video communications.

In some demonstrative embodiments, the wireless dual-mode transceiver is capable of adjusting a ratio between a length of the first time period and a length of the second time period based on the criterion.

In some demonstrative embodiments, the first time period includes at least part of a vertical blanking time period between two video frames of the wireless video communications.

In some demonstrative embodiments, a combined length of the first and second time periods is divisible by a length of a beacon period of the wireless-local-area-network link.

In some demonstrative embodiments, a length of the first time period is substantially equal to a length of a downlink transmission of data representing a video frame over the wireless video communication link.

In some demonstrative embodiments, the wireless dual-mode receiver is capable of receiving a wireless-local-area-network packet over the wireless-local-area-network link during the second time period.

In some demonstrative embodiments a wireless communication system may include an access point; and at least one wireless communication device including a dual-mode transceiver capable of switching between first and second wireless communication modes during first and second time periods, respectively, wherein at the first communication mode the transceiver is capable of performing wireless-local-area-network communications with the access point over a wireless-local-area-network link, and wherein at the second communication mode the transceiver is capable of performing wireless video communications over a wireless video communication link.

In some demonstrative embodiments, the system may include a wireless video receiver to receive from the mobile device wireless video transmissions over the wireless video communication link.

In some demonstrative embodiments, the wireless-local-area-network link may include a communication link over a first frequency band, and the wireless video communication link may include a communication link over a second frequency band different than the first frequency band.

In some demonstrative embodiments, the wireless dual-mode transceiver is capable of adjusting at least one of the first and second time periods based on a criterion related to at least one of the wireless-local-area-network communications and the wireless-video communications.

In some demonstrative embodiments, a combined length of the first and second time periods is divisible by a length of a beacon period of the wireless-local-area-network link.

In some demonstrative embodiments, the first time period includes at least part of a vertical blanking time period between two video frames of the wireless video communications.

In some demonstrative embodiments a method may include performing wireless-local-area-network communications between a transceiver and an access point over a wireless-local-area-network link during a first time period; and performing wireless video communications between the transceiver and a wireless video receiver over a wireless video communication link during a second time period.

In some demonstrative embodiments, the method may include automatically switching between first and second wireless communication modes of the transceiver to perform the wireless-local-area-network communications and the wireless video communications, respectively.

In some demonstrative embodiments, the wireless-local-area-network link may include a communication link over a first frequency band, and wherein the wireless video communication link may include a communication link over a second frequency band different than the first frequency band.

In some demonstrative embodiments, the method may include adjusting at least one of the first and second time periods based on a criterion related to at least one of the wireless-local-area-network communications and the wireless-video communications.

In some demonstrative embodiments, a combined length of the first and second time periods is divisible by a length of a beacon period of the wireless-local-area-network link.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. Moreover, some of the blocks depicted in the drawings may be combined into a single function. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion. Unless specifically stated otherwise, as apparent from the following discussions, it is appreciated that throughout the specification discussions utilizing terms such as "processing," "computing," "calculating," "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications or any other suitable application. In some demonstrative embodiments the methods, devices and/or systems disclosed herein may be used in the field of consumer electronics, for example, as part of any suitable television, video Accessories, Digital-Versatile-Disc (DVD), multimedia projectors, Audio and/or Video (A/V) receivers/transmitters, gaming consoles, video cameras, video recorders, and/or automobile A/V accessories. In some demonstrative embodiments the methods, devices and/or systems disclosed herein may be used in the field of Personal Computers (PC), for example, as part of any suitable desktop PC, notebook PC, monitor, and/or PC accessories. In some demonstrative embodiments the methods, devices and/or systems disclosed herein may be used in the field of professional A/V, for example, as part of any suitable camera, video camera, and/or A/V accessories. In some demonstrative embodiments the methods, devices and/or systems disclosed herein may be used in the medical field, for example, as part of any suitable endoscopy device and/or system, medical video monitor, and/or medical accessories. In some demonstrative embodiments the methods, devices and/or systems disclosed herein may be used in the field of security and/or surveillance, for example, as part of any suitable security camera, and/or surveillance equipment. In some demonstrative embodiments the methods, devices and/or systems disclosed herein may be used in the fields of military, defense, digital signage, commercial displays, retail accessories, and/or any other suitable field or application.

Although embodiments of the invention are not limited in this respect, one or more of the methods, devices and/or systems disclosed herein may be used to wirelessly transmit video signals, for example, High-Definition-Television (HDTV) signals, between at least one video source and at least one video destination. In other embodiments, the methods, devices and/or systems disclosed herein may be used to transmit, in addition to or instead of the video signals, any other suitable signals, for example, any suitable multimedia signals, e.g., audio signals, between any suitable multimedia source and/or destination.

Although some demonstrative embodiments are described herein with relation to wireless communication including video information, embodiments of the invention are not limited in this respect and some embodiments may be implemented to perform wireless communication of any other suitable information, for example, multimedia information, e.g., audio information, in addition to or instead of the video information. Some embodiments may include, for example, a method, device and/or system of performing wireless communication of A/V information, e.g., including audio and/or video information. Accordingly, one or more of the devices, systems and/or methods described herein with relation to video information may be adapted to perform wireless communication of A/V information.

Although embodiments of the invention are not limited in this respect, some demonstrative embodiments may be implemented to communicate wireless-video signals over a wireless-video communication link, as well as Wireless-Local-Area-Network (WLAN) signals over a WLAN link. Such implementation may allow a user, for example, to play a movie, e.g., on a laptop computer, and to wirelessly transmit video signals corresponding to the movie to a video destination, e.g., a screen, while maintaining a WLAN connection, e.g., with the Internet and/or one or more other devices connected to a WLAN network. In one example, video information corresponding to the movie may be received over the WLAN network, e.g., from the Internet.

Figure 1:
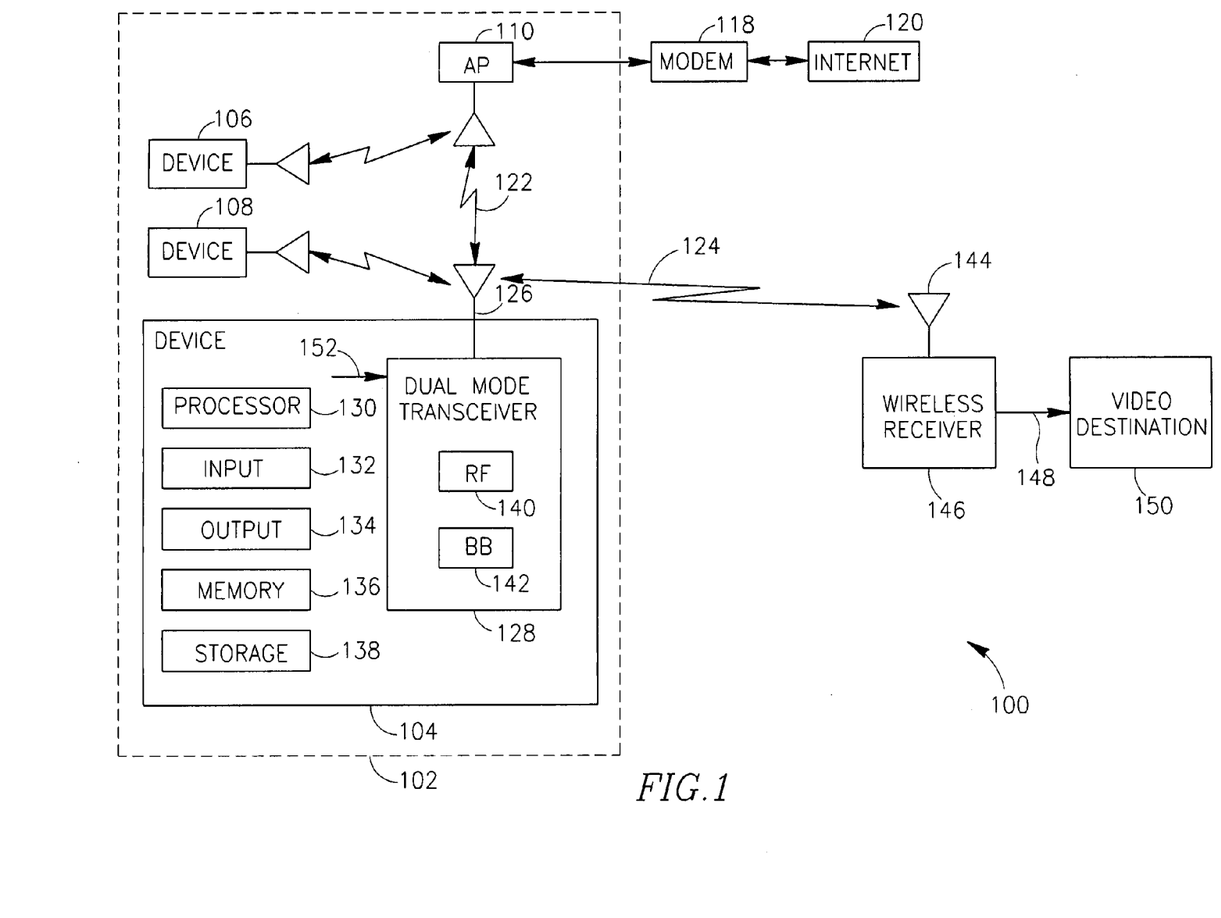
FIG. 1 is a schematic illustration of a wireless communication system in accordance with some demonstrative embodiments.

Reference is made to FIG. 1, which schematically illustrates a wireless communication system 100, in accordance with some demonstrative embodiments.

In some demonstrative embodiments, system 100 may include at least one wireless communication device 104 capable of performing WLAN communications with an Access Point (AP) 110 over a WLAN link 122, and performing wireless-video communications with a wireless-video receiver 146 over a wireless-video communication link 124, e.g., as described in detail below.

In some demonstrative embodiments, device 104 and AP 110 may be part of a WLAN network 102. In one example, WLAN network 102 may include one or more other wireless communication devices, e.g., devices 106 and/or 108, capable of communicating with AP 110. WLAN network 102 may operate in accordance with any suitable standard or protocol, for example, existing Institute-of-Electrical-and-Electronics-Engineers (IEEE) 802.11, 802.11a, 802.11b, 802.11g, 802.11k, 802.11n, and/or 802.11r standards and/or future versions and/or derivatives and/or Long Term Evolution (LTE) of the above standards ("the 802.11 standards"). Accordingly, WLAN communication link 122 may be established in accordance with the 802.11 standards and/or any other suitable WLAN standard or protocol.

In some demonstrative embodiments, AP 110 may be connected to the Internet 120, e.g., using any suitable modem 118. In some embodiments, AP 110 may communicate to device 104, e.g., via WLAN communication link 122, data received from Internet 120, devices 106 and/or 108, and/or any other suitable source associated with AP 110.

In some demonstrative embodiments, devices 104, 106 and/or 108 may include any suitable portable device and/or non-portable device. In one example, device 104 may include, may be, or may perform the functionality of a mobile device, e.g., a laptop, a Personal Digital Assistants (PDA), a handheld computer, a notebook computer, a portable game console, a Voice-Over-Internet-Prototcol (VoIP) phone, a portable video device, a portable computer, a video camera, a mobile phone, a portable television (TV) tuner, a photo viewer, a media player, a portable video player, a portable DVD player, and/or an MP-4 player. In another example, device 104 may include, may be, or may perform the functionality of a non-portable device, e.g., a desktop computer, a non-portable computer, a workstation, a non-portable video source, a Set-Top-Box (STB), a DVD, digital-video-recorder, a non-portable game console, a PC, a Video Cassette Recorder (VCR), a non-portable television (TV) tuner, a non-portable media player, a non-portable video player, a portable-video-player, a DVD player, an MP-4 player, and/or a video dongle.

In some demonstrative embodiments, device 104 may include a dual mode transceiver (TRX) 128 capable of operating at first and second wireless communication modes. At the first communication mode transceiver 128 may perform WLAN communications over WLAN link 122, and at the second communication mode transceiver 128 may perform wireless-video communications over wireless-video communication link 124, e.g., as described in detail below.

In some demonstrative embodiments, WLAN link 122 may include a communication link over a first frequency band, denoted f1, and wireless-video communication link 124 may include a communication link over a second frequency band, denoted f2, different than the first frequency band, e.g., as described below. Dual-mode transceiver 128 may selectively switch between the first and the first and second frequency bands, for example, in accordance with the first and second communication modes.

In some demonstrative embodiments, the first and second frequency bands may be located, for example, within a predefined Radio Frequency (RF) band. For example, the predefined RF band may be within an approximate range of 2.4-2.5 Giga Hertz (GHz), an approximate range of 5-5.25 GHz, and/or any other suitable RF range, e.g., in accordance with the 802.11 standards. The first and/or second frequency bands may have any suitable bandwidth, for example, between 20 and 40 Mega-Hertz (MHz).

In some demonstrative embodiments, device 104 may also include a processor 130, an input 132, an output 134, a memory 138 and/or storage 138. Device 104 may optionally include other suitable hardware components and/or software components.

In some demonstrative embodiments, processor 130 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller.

In some embodiments, processor 130 may generate video information, e.g., in the form of video signals 152, to be transmitted over wireless-video communication link 124. Video signals 152 may include signals of any suitable video format. In one example, signals 152 may include HDTV video signals, for example, uncompressed HDTV signals, e.g., in a Digital Video Interface (DVI) format, a High Definition Multimedia Interface (HDMI) format, a Video Graphics Array (VGA), a VGA DB-15 format, an Extended Graphics Array (XGA) format, and their extensions, or any other suitable video format.

In some demonstrative embodiments, video signals 152 may include video information generated and/or received from one or more sources, e.g., in addition to and/or other than processor 120 and/or device 104. For example, video signals 152 may include video information received over WLAN communication link 122. In one example, device 104 may receive over WLAN communication link 122 WLAN transmissions including video information from AP 110 ("the WLAN video, information"). The WLAN video information may include, for example, video information corresponding to a video, a movie, a television program, a network game, and the like. For example, AP 110 may receive and/or retrieve the WLAN video information from Internet 120, devices 106 and/or 108 and/or any other suitable video source associated with AP 110.

In some demonstrative embodiments, input 132 includes, for example, a keyboard, a keypad, a mouse, a touch-pad, a track-ball, a stylus, a microphone, or other suitable pointing device or input device. Output 134 includes, for example, a monitor, a screen, a Cathode Ray Tube (CRT) display unit, a Liquid Crystal Display (LCD) display unit, a plasma display unit, one or more audio speakers, or other suitable output devices. Memory 136 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage 138 includes, for example, a hard disk drive, a floppy disk drive, a Compact Disk (CD) drive, a CD-ROM drive, a DVD drive, or other suitable removable or non-removable storage units. Memory unit 136 and/or storage 136 may store, for example, store data processed by device 104. In one example, memory 136 and/or storage 138 may store at least part of the video information corresponding to video signals 152.

In some demonstrative embodiments, some or all of the components of device 104 may be enclosed in a common housing, packaging, or the like, and may be interconnected or operably associated using one or more wired or wireless links. In other embodiments, components of device 104 may be distributed among multiple or separate devices.

In some demonstrative embodiments, dual-mode transceiver 128 may include, for example, a wireless RF module 140 able to transmit and/or receive, e.g., via at least one antenna 126, wireless RF signals, blocks, frames, transmission streams, packets, beacon packets, WLAN packets, video frames, control signals, messages and/or data over WLAN communication link 122 and/or wireless-video communication link 124, e.g., as described below. Although embodiments of the invention are not limited in this respect, antenna 126 may include an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

In some demonstrative embodiments, dual-mode transceiver 128 may also include at least one Base-Band (BB) module 142 capable of handling WLAN signals of the WLAN communications over link 122, and wireless-video signals of the wireless-video communications over link 124, e.g., as described below with reference to FIG. 2.

In some demonstrative embodiments, dual mode transceiver 128 may transmit via link 124 a downlink (DL) wireless-video transmission including video information corresponding to video signals 152, e.g., when dual-mode transceiver 128 is at the second mode of operation. Transceiver 128 may implement any suitable transmission method and/or configuration to transmit the DL wireless-video transmission. Although embodiments of the invention are not limited in this respect, in some demonstrative embodiments, transmitter 108 may transmit the DL wireless-video transmission using an Orthogonal-Frequency-Division-Multiplexing (OFDM) modulation scheme, a Phase-shift keying (PSK) modulation scheme, a Quadrature amplitude modulation (QAM) scheme, and/or any other suitable transmission and/or modulation scheme. In some demonstrative embodiments, the wireless transmission may include Multiple-Input-Multiple-Output (MIMO) transmission, for example at least one antenna 126 may include a plurality of antennas. Dual mode transceiver 128 may also receive via link 124 an uplink (UL) transmission including, for example, any suitable data, control an/or maintenance information from receiver 146, e.g., when dual-mode transceiver 128 is at the second mode of operation.

Although embodiments of the invention are not limited in this respect, according to some demonstrative embodiments wireless-video communication link 124 may include any suitable wireless communication link, e.g., a wireless-video communication link as described in U.S. patent application Ser. No. 11/551,641, entitled "Apparatus and method for uncompressed, wireless transmission of video", filed Oct. 20, 2006, and published May 3, 2007, as US Patent Application Publication US 2007-0098063 ("the '641 Application"), the entire disclosure of which is incorporated herein by reference. In some embodiments transceiver 128 may apply a de-correlating transformation, e.g., a DCT and/or a wavelet, to video signals 152, e.g., as described in the '641 Application. For example, transceiver 128 may perform the de-correlating transform on a plurality of color components, e.g., in the format Y-Cr-Cb, representing pixels of video signals 152, as described in the '641 Application. In some demonstrative embodiments, the DL wireless-video transmission may include values of fine constellation symbols, and values of coarse constellation symbols, e.g., as described in the '641 Application.

In some demonstrative embodiments, receiver 146 may generate output video signals 148, e.g., corresponding to video signals 152. For example, receiver 146 may be implemented by the wireless-video receiver described in the '641 Application. System 100 may also include a video destination 150, which may include any suitable software and/or hardware to receive, process, store, and/or handle signals 148 in any suitable manner. In one example, video destination 150 may include any suitable video display and/or receiver. For example, video destination 150 a display or screen, e.g., a flat screen display, a Liquid Crystal Display (LCD), a plasma display, a back projection television, a television, a projector, a monitor, an audio/video receiver, a video dongle, and the like. In some demonstrative embodiments, video destination 150 and receiver 146 may be implemented as part of video destination module, e.g., such that video destination 150 and receiver 146 are enclosed in a common housing, packaging, or the like. In other embodiments, video destination 150 and receiver 146 may be implemented as separate devices.

In some demonstrative embodiments, dual-mode transceiver 128 may operate at the first and second wireless communication modes during first ("the WLAN period") and second ("the wireless-video period") time periods, respectively, e.g., as described in detail below.

In some demonstrative embodiments, the length of the first time period may be, for example, between 1 millisecond (ms) and 20 ms, e.g., 16 ms; and/or the length of the second time period may be, for example, at least 100 ms, e.g., between 100 ms and 1000 ms, as described below.

In some demonstrative embodiments, dual-mode transceiver 128 may adjust at least one of the first and second time periods based on any suitable criterion. In one example, the criterion may be based on at least one parameter related to the WLAN communications over WLAN communication link 122. The at least one parameter may include, for example, a throughput of the WLAN communications, e.g., as described below. In another example, the criterion may be based on at least one parameter related to the wireless-video communications over link 124, for example, a video format of the wireless-video communications, e.g., as described below. In yet another example, the criterion may be based on a combination of at least one parameter related to the WLAN communications over WLAN communication link 122 and on at least one parameter related to the wireless-video communications over link 124.

In some demonstrative embodiments, dual-mode transceiver 128 may adjust a ratio between lengths of the first and second time periods based on the criterion, e.g., as described below.

In some demonstrative embodiments, the first time period may include at least part of a Vertical Blanking (VB) time period between two video frames of the DL video transmission over link 124, e.g., as described below with reference to FIG. 3A.

In some demonstrative embodiments, a combined length of the first and second time periods may be divisible by a length of a beacon period of WLAN link 122, e.g., as described below with reference to FIGS. 3B and/or 3C.

In some demonstrative embodiments, the length of the first time period may be substantially equal to the length of the DL transmission of data representing a video frame over link 124, e.g., as described below with reference to FIGS. 3B and/or 3C.

In some demonstrative embodiments, dual-mode transceiver 128 may receive at least one WLAN packet over WLAN link 122 during the second time period, e.g., as described below with reference to FIG. 3C.

In some demonstrative embodiments, AP 110 may periodically broadcast beacon packets including a Service Set Identifier (SSID), e.g., as defined by the 802.11 standards. A wireless communication device of network 102, e.g., device 104, receiving the beacon packet may decide whether or not to connect to AP 110; and/or may utilize the beacon packet to synchronize between the wireless communication device and AP 110, e.g., in accordance with the 802.11 standards.

In some demonstrative embodiments, WLAN network 102 may implement a power-save mode mechanism, e.g., as defined by the 802.11 standards. For example, device 104 may indicate to AP 110 that device 104 is to be treated as a device at a power save mode, e.g., as described in detail below. AP 110 may maintain a list of at least one wireless communication device, which is at the power-save mode ("power save device"). AP 110 may buffer data packets addressed to the power save device, e.g., until the power save device specifically requires to receive data from AP 110, e.g., by either sending a polling request packet or switching back to a regular operation mode. The beacon packets from AP 110 may include an indication informing the power-save device of buffered data packets intended for the power save device.

In some demonstrative embodiments, dual mode transceiver 128 may indicate to AP 110 that device 104 is to be treated as being at the power save mode, for example, during at least part of the second time period, e.g., while communicating wireless-video communications over link 124. Device 104 may implement any suitable power-save indication to AP 110, e.g., in accordance with the 802.11 standards. However, in other embodiments, dual mode transceiver 128 may not indicate to AP 110 that device 104 is to be treated as being at the power save mode, for example, during at least part of the second time period. For example, transceiver 128 may operate at a normal WLAN mode with respect to WLAN link 122, e.g., during at least part of the second time period.

Figure 2:
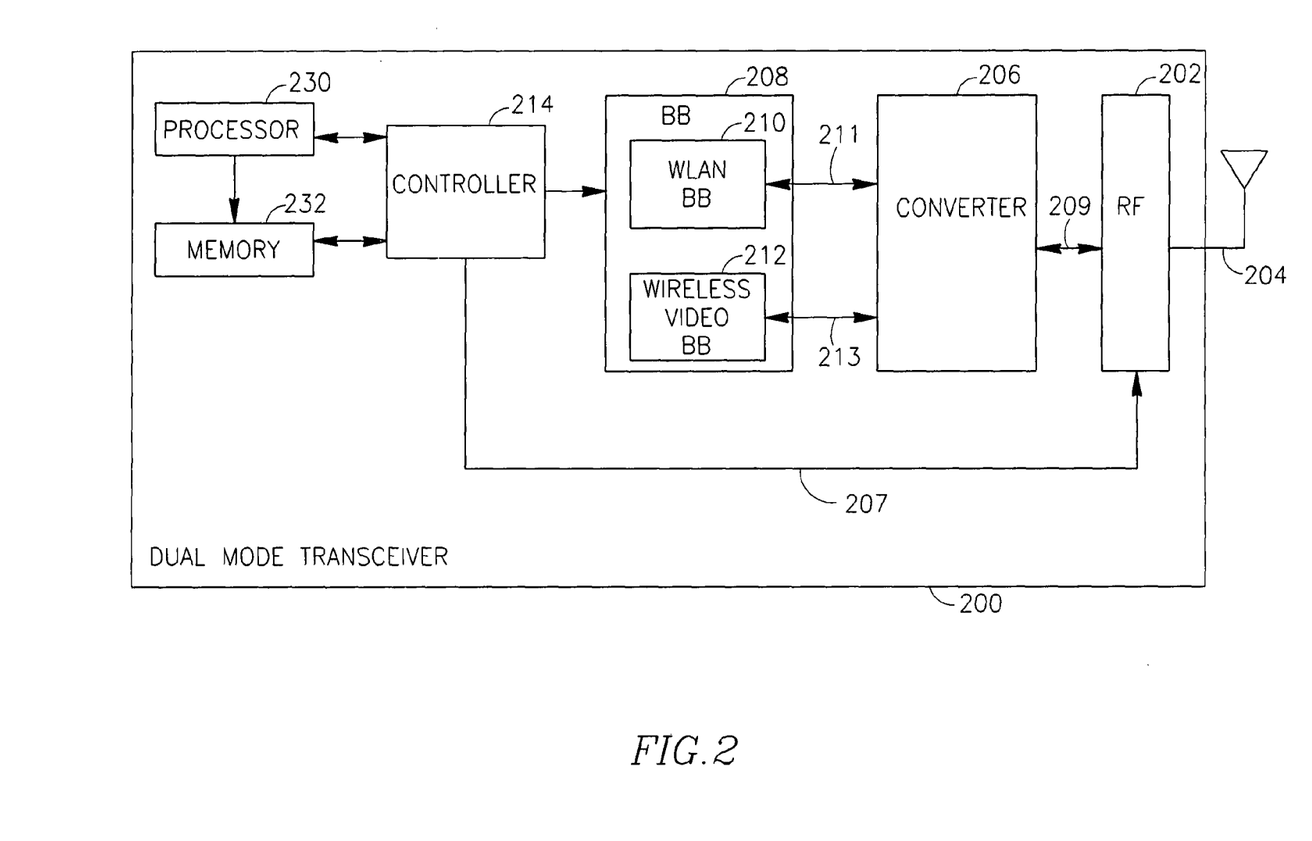
FIG. 2 is a schematic illustration of a dual-mode wireless transceiver in accordance with some demonstrative embodiments.

Reference is now made to FIG. 2, which schematically illustrates a dual mode transceiver 200 in accordance with some demonstrative embodiments. Although embodiments of the invention are not limited in this respect, in some demonstrative embodiments dual mode transceiver 200 may perform the functionality of dual mode transceiver 128 (FIG. 1). For example, transceiver 200 may operate at first and second wireless communication modes to perform WLAN communications over a WLAN communication link, e.g., WLAN communication link 122 (FIG. 1), and wireless-video communications over a wireless-video communication link, e.g., wireless-video communication link 124 (FIG. 1), respectively.

In some demonstrative embodiments, transceiver 200 may include a RF interface module 202, a converter 206, at least one Base-Band (BB) module 208, a controller 214, a processor 230 and a memory 232, e.g., as described below.

In some demonstrative embodiments, processor 230 and/or memory 232 may handle data corresponding to the WLAN communications and/or wireless-video communications received and/or transmitted by transceiver 200. For example, processor 230 and/or memory 232 may be implemented to extract and/or process data and/or video information from signals transmitted to and/or from transceiver 200, to measure signal strength, and/or maintain one or more data structures corresponding to the WLAN link, e.g., in accordance with the 802.11 standards, and/or the wireless-video link, e.g., as described in the '641 application.

In some demonstrative embodiments, RF module 202 may perform WLAN communications and wireless-video communications over WLAN and wireless-video links, e.g., links 122 and 124 (FIG. 1), respectively, via at least one antenna 204. Although embodiments of the invention are not limited in this respect, antenna 204 may include an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

In some demonstrative embodiments, RF module 202 may controllably filter and/or isolate at least one selected frequency band, e.g., based on a control signal 207 from controller 214. In one example, RF module 202 may include a tunable filter capable of being tuned, for example, to a center frequency corresponding to the selected frequency band. RF module 202 may controllably switch, for example, between the frequency band f1 of the WLAN communication link, and the frequency band f2 of the wireless-video communication link, e.g., based on control signal 207.

In some demonstrative embodiments, controller 214 may generate control signal 207 in accordance with the communication mode of operation of transceiver 200. For example, controller 214 may generate control signal 207, e.g., having a first value, which may result in RF module 202 communicating over the frequency band f1, e.g., if transceiver is to operate at the first communication mode; or control signal 207, e.g., having a second value, which may result in RF module 202 communicating over the frequency band f2, e.g., if transceiver is to operate at the second communication mode.

In some demonstrative embodiments, RF module may receive from, and/or provide to, converter 206 analog signals 209 corresponding to the WLAN and/or wireless-video communications. For example, RF module 202 may receive from converter 206 analog signals corresponding to transmissions to be transmitted by transceiver 200 over the WLAN link and/or the wireless-video link; and/or RF module may provide converter with RF analog signals corresponding to transmissions received by transceiver 200 via the WLAN link and/or the wireless-video link. Analog signals 209 may include analog BB signals at a BB frequency. For example, RF module 202 may shift the frequency of the signals received via antenna 204 from a carrier frequency band, e.g., of the frequency bands f1 and/or f2, to a BB frequency band; and/or shift the frequency of the signals received from converter 206 from the BB frequency band to the carrier frequency band, e.g., of the frequency bands f1 and/or f2.

In some demonstrative embodiments, converter 206 may convert the analog BB signals received from RF module 202 into digital BB signals, e.g., by performing any suitable sampling; and/or convert digital BB signals received from BB module 208 into analog BB signals to be provided to RF module 202. Converter 206 may include any suitable converter, for example, at least one Analog-to-Digital (A/D), at least one Digital-to-Analog (D/A) converter, and/or any combination thereof.

In some demonstrative embodiments, BB module 208 may handle WLAN signals of the WLAN communications and wireless-video signals of the wireless-video communications, e.g., as described below.

In some demonstrative embodiments, BB module 208 may include a WLAN BB module 210 to handle WLAN signals 211 of the WLAN communications, and a wireless-video BB module 212 to handle signals 213 of the wireless-video communication link, e.g., as described below. However, in other embodiments, BB module may include any other configuration, e.g., including a single BB module to handle both signals 211 as well as signals 213.

In some demonstrative embodiments, WLAN BB module 210 may include, be, or perform the functionality of any suitable WLAN module, e.g., in accordance with the 802.11 standards. For example, WLAN module 210 may demodulate signals 211 received from converter 206, e.g., in accordance with any suitable demodulation protocol and/or algorithm, e.g., using one or more of the demodulation protocols defined by the 802.11 standards. WLAN module 210 may also modulate data to be transmitted over the WLAN link according to any suitable modulation protocol, e.g., in accordance with the 802.11 standards.

In some demonstrative embodiments, wireless-video BB module 212 may modulate video information to be transmitted over the wireless-video link according to any suitable modulation protocol, e.g., as described in the '641 application. In some embodiments, module 212 may apply a de-correlating transformation, e.g., a DCT and/or a wavelet, to video signals representing the video information, e.g., video signals 152 (FIG. 1), e.g., as described in the '641 Application. For example, module 212 may perform the de-correlating transform on a plurality of color components, e.g., in the format Y-Cr-Cb, representing pixels of the video signals, as described in the '641 Application. In some demonstrative embodiments, module 210 may generate signals 213 including values of fine constellation symbols, and values of coarse constellation symbols corresponding to the transformation coefficients, e.g., as described in the '641 Application. For example, some of the transform coefficients ("the important coefficients"), e.g., the most significant bits of the coefficients representing lower frequencies of the Y-Cr-Cb components, may be represented by coarse constellation symbols, e.g., according to a QPSK or QAM scheme; and/or transformation coefficients representing higher frequencies of the Y-Cr-Cb components, and/or quantization error values of the important coefficients, may be represented by pairs of real and imaginary portions of a complex number, and mapped to fine constellation symbols, e.g., according to an OFDM scheme. The coarse and fine constellation symbols may be encapsulated in frames ("video frames") having a preamble and a header, e.g., as described in the '641 Application. Converter 206 may convert the video frames of signals 213 into the analog signals to be provided to RF module 202. For example, converter 206 may sample the video frames at a sampling rate of at least 40 MHz. RF module 202 may handle both the coarse and fine symbols, e.g., as described in the '641 Application.

In some demonstrative embodiments, controller 214 may controllably activate WLAN BB module 210 and wireless-video BB module 212, e.g., according to the first and second wireless communication modes of operation. For example, controller 214 may control WLAN BB module 210 and wireless-video BB module 212 according to any suitable wireless communication link allocation scheme, e.g., as described below with reference to FIGS. 3A, 3B, and/or 3C, to schedule the WLAN communications and wireless-video communications, for example, without substantially affecting the quality of, reducing the quality of, and/or loosing information of the wireless-video and/or WLAN communications.

In some demonstrative embodiments, controller 208 may control WLAN BB module 210 to buffer WLAN data to be transmitted over the WLAN link, e.g., until switching to the WLAN communication mode. In some embodiments, controller 214 may also instruct WLAN BB module 210 to operate in the power-save mode, e.g., when transceiver 200 operates at the wireless-video communication mode. In other embodiments, WLAN BB module 210 may operate at the normal mode of operation, e.g., during at least part of the time period in which transceiver 200 operates at the wireless-video communication mode.

In some demonstrative embodiments, controller 208 may control wireless-video BB module 212 to buffer video data of the video frames to be transmitted over the wireless-video link, e.g., until switching to the wireless-video communication mode. Controller 224 may control the operation of RF module 202, e.g., using control signal 207, to perform the communications over the WLAN and wireless-video links, e.g., as described above.

Figure 3A:
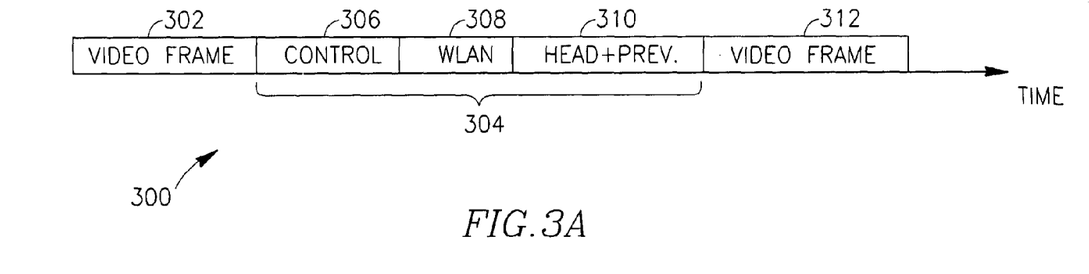
FIG. 3A is a schematic illustration of a wireless communication link allocation scheme in accordance with one demonstrative embodiment.

FIG. 3A schematically illustrates a wireless communication link allocation scheme 300 in accordance with one demonstrative embodiment. Although embodiments of the invention are not limited in this respect scheme 300 may be implemented by a dual-mode transceiver, e.g., transceiver 128 (FIG. 1), to communicate over WLAN and wireless-video communication links during first and second time periods, respectively, e.g., as described above.

In some demonstrative embodiments, scheme 300 may allocate the first time period to be used for the WLAN communications during at least part of a VB time period between two video frames of the wireless-video communications, e.g., as described below.

In some demonstrative embodiments, link allocation scheme 300 may include a time period 302 allocated to a DL wireless transmission over the wireless-video link, e.g., including video data corresponding to a video frame. In some embodiments, video signals 152 (FIG. 1) may include no video data during a predefined time period succeeding each video frame ("the VB period"). The VB period may correspond to a time period required for trace back of an electron beam of a Cathode-Ray Tube (CRT).

In some demonstrative embodiments, link allocation scheme 300 may include a VB period 304 corresponding to the VB period of signals 152 (FIG. 1). A portion of VB period 304 may be allocated to communications exchanging maintenance and/or information with a wireless video receiver. For example, a time period 306 within VB period 304 may be allocated to transmission of one or more uplink control and/or management signals, e.g., over the wireless-video link; and/or a time period 310 within VB 304 may be allocated to a downlink transmission over the wireless-video link of a header and/or preamble corresponding to a succeeding video frame to be transmitted during a succeeding time period 312. A time period 308 of VB period 304 may be allocated to WLAN communications over the WLAN communication link.

In some demonstrative embodiments, VB period 304 may have a length of, for example, 0.67 milliseconds (ms). Periods 306 and 310 may have a length of, for example, at least 350 microseconds. Accordingly, time period 308 allocated to the WLAN communications may have a length of, for example, up to 317 microseconds, which may correspond to a throughput of for example, up to 100 kilobyte (kB) per second. WLAN time period 308 may be implemented, for example, for synchronizing with an AP, e.g., AP 110 (FIG. 1).

Figure 3B:
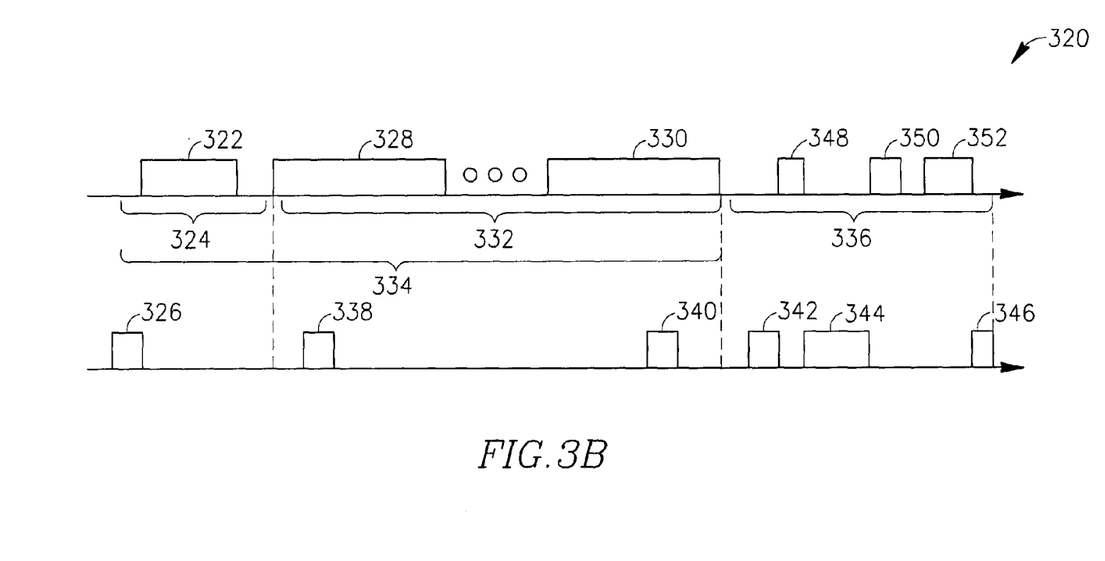
FIG. 3B is a schematic illustration of a wireless communication link allocation scheme in accordance with another demonstrative embodiment.
Figure 3C:
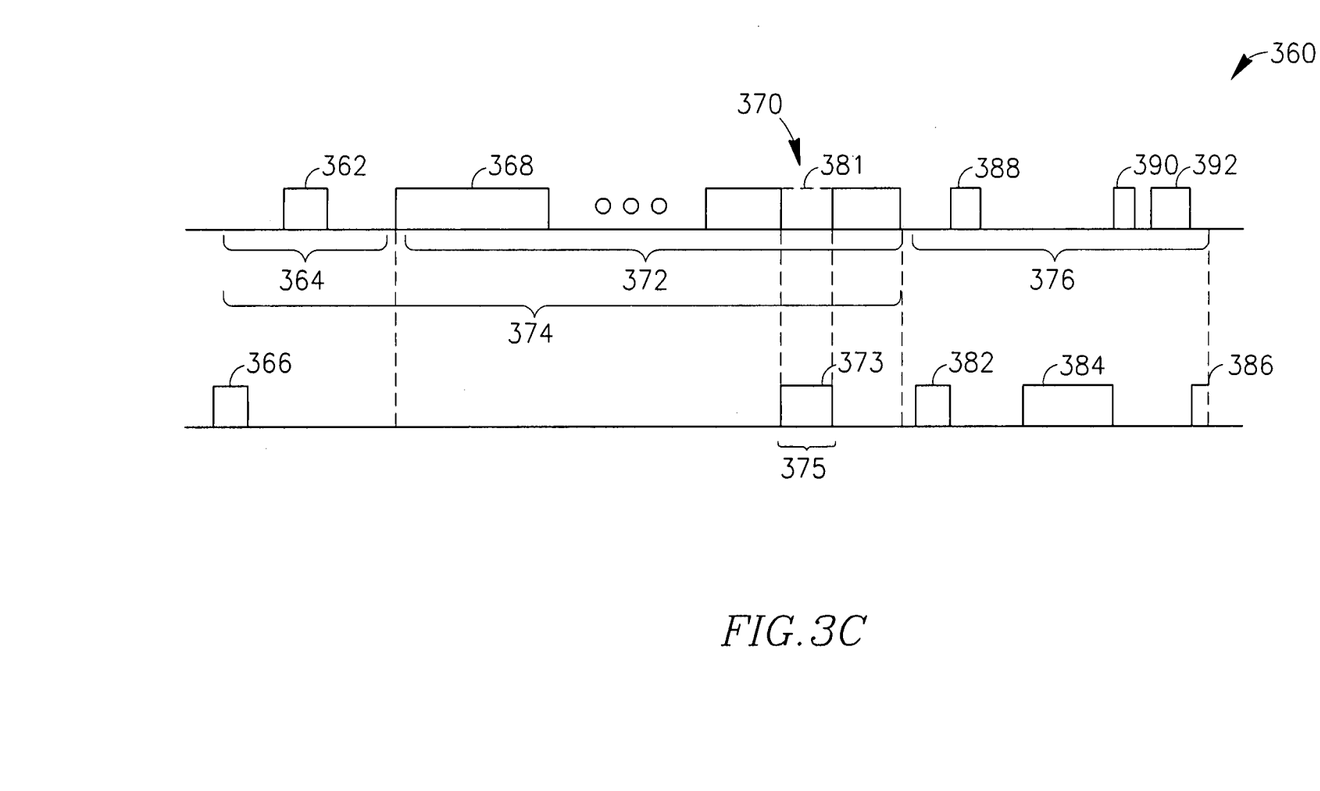
FIG. 3C is a schematic illustration of a wireless communication link allocation scheme in accordance with another demonstrative embodiment.

FIG. 3B schematically illustrates a wireless communication link allocation scheme 320 in accordance with another demonstrative embodiment. Although embodiments of the invention are not limited in this respect scheme 320 may be implemented by a dual-mode transceiver, e.g., transceiver 128 (FIG. 1), to communicate over WLAN and wireless-video communication links during first and second time periods, respectively, e.g., as described above.

In some demonstrative embodiments, scheme 320 may allocate a first time period 324 to WLAN communications over the WLAN communication link, and a second time period 332 to wireless-video communications over the wireless-video communication link. The lengths of time periods 324 and 332 may be determined, for example, based on the length of a beacon period of the WLAN link. For example, the length of a time period 334 including both time periods 324 and 332 may be divisible by the length of the beacon period. For example, the length of time period 334 may be equal to the product of the length of the beacon period and a beacon factor value, denoted Bn. In one example, the beacon period may have a length of 200 ms, and the factor Bn may be equal to 5. Accordingly, the length of time period 334 may be 5*200 msec=1 second. In another example, the beacon period may have a length of 100 msec and the factor Bn may be equal to 5, 10, or any suitable value.

In some demonstrative embodiments, a length of WLAN time period 324 may be substantially equal to a length of a downlink transmission of data representing a video frame over the wireless-video communication link. For example, time period 324 may have a length of 16 ms.

In some demonstrative embodiments, during time period 324 video frames, e.g., a sequence of video frames including video frames 328 and 330, may be transmitted over the wireless-video link, e.g., from transceiver 128 (FIG. 1) to receiver 146 (FIG. 1).

In some demonstrative embodiments, WLAN communications may be performed, e.g., between transceiver 128 (FIG. 1) and AP 110 (FIG. 1), during WLAN period 324 and/or during subsequent WLAN time periods, e.g., a time period 336 subsequent to time period 332. For example, a WLAN data packet 322 may be transmitted over the WLAN link, e.g., by transceiver 128 (FIG. 1), in response to a beacon packet 326, e.g., received from AP 110 (FIG. 1), during time period 324; and/or a polling request 348 may be transmitted over the WLAN link, e.g., by transceiver 128 (FIG. 1), in response to a beacon packet 342, e.g., transmitted by AP 110 (FIG. 1), during time period 336. Transceiver 128 (FIG. 1) may not respond, for example, to beacon packets transmitted over the WLAN link, e.g., from AP 110 (FIG. 1), during time period 332, e.g., packets 338 and 340. In one example, WLAN data packets 344, e.g., including data packets buffered by AP 110 (FIG. 1) during time period 332, may be received over the WLAN link, e.g., by transceiver 128 (FIG. 1), during time period 336, for example, in response to polling request 348. Additionally or alternatively, one or more WLAN data packets 352 may be transmitted over the WLAN link, e.g., by transceiver 128 (FIG. 1). One or more Acknowledgment (ACK) packets 350 and 346 may be exchanged over the WLAN link, e.g., to acknowledge receipt of data packets 344 and 352, respectively.

In some demonstrative embodiments, scheme 320 may not allow transmission of video frames over the wireless-video link during the WLAN time periods, e.g., during periods 324 and 326. In some embodiments, a wireless-video receiver, e.g., receiver 146 (FIG. 1) may buffer video data corresponding to one or more video frames received over the wireless-video link during time period 332, e.g., according to any suitable buffering method and/or function; and provide the buffered video data to a video destination, e.g., video destination 150 (FIG. 1), during WLAN period 336 succeeding time period 332.

In some demonstrative embodiments, at least one of time periods 324 and 332 may be adjusted, e.g., by transceiver 128 (FIG. 1), based on any suitable criterion, e.g., as described below.

In some demonstrative embodiments, a ratio between the lengths of time periods 324 and 332 may be adjusted, e.g., by adjusting the value of the factor Bn, based on the criterion, e.g., as described below.

In one example, the criterion may be based on at least one parameter related to the WLAN communications over the WLAN communication link. The at least one parameter may include, for example, a throughput of the WLAN communications. For example the value of the factor Bn, may be decreased if, for example, throughput of the WLAN communications increases.

In another example, the criterion may be based on at least one parameter related to the wireless-video communications over the wireless-video link. In one example, the length of time period 332 may be adjusted based on a data size of the video frame corresponding to a video format, e.g., the number of pixels per frame and/or a frame rate, of the wireless-video communications. In another example, the value of the factor Bn may be adjusted according to the video format of the wireless-video communications, e.g., the factor Bn may be adjusted to enable transmission of an integral number of video frames during the time period having the length of Bn* beacon period.

In some embodiments the length of time period 332 may be at least 100 ms, e.g., between 100 ms and 1000 ms. In one example, time period 332 may have a length of 184 ms, and time period 324 may have a length of 16 ms. In another example, time period 332 may have a length of 984 ms, and time period 324 may have a length of 16 ms. In another example, time period 332 may have a length of 484 ms, and time period 324 may have a length of 16 ms. In other examples, time periods 332 and/or 334 may have any other suitable lengths.

FIG. 3C schematically illustrates a wireless communication link allocation scheme 360 in accordance with another demonstrative embodiment. Although embodiments of the invention are not limited in this respect scheme 360 may be implemented by a dual-mode transceiver, e.g., transceiver 128 (FIG. 1), to communicate over WLAN and wireless-video communication links during first and second time periods, respectively, e.g., as described above.

In some demonstrative embodiments, scheme 360 may allow the transceiver, e.g., transceiver 128 (FIG. 1), to receive at least one WLAN packet over the WLAN communication link during a time period allocated to the wireless-video communications over the wireless-video link, e.g., as described below. The WLAN packet may include any suitable packet, for example, a packet of relatively high importance or low latency requirements, e.g., a VoIP packet, a beacon packet or any other WLAN packet.

In some demonstrative embodiments, scheme 360 may allocate a first time period 364 to WLAN communications over the WLAN communication link, and a second time period 372 to wireless-video communications over the wireless-video communication link. The lengths of time periods 364 and 372 may be determined, for example, based on the length of a beacon period of the WLAN link, e.g., as described above with reference to FIG. 3B.

In some demonstrative embodiments, a length of WLAN time period 364 may be substantially equal to a length of a downlink transmission of data representing a video frame over the wireless-video communication link, e.g., as described above with reference to FIG. 3B.

In some demonstrative embodiments, during time period 364 video frames, e.g., a sequence of video frames including video frames 368 and 370, may be transmitted over the wireless-video link, e.g., from transceiver 128 (FIG. 1) to receiver 146 (FIG. 1).

In some demonstrative embodiments, WLAN communications may be performed, e.g., between transceiver 128 (FIG. 1) and AP 110 (FIG. 1), during WLAN period 364 and/or during subsequent WLAN time periods, e.g., a time period 376 subsequent to time period 372. For example, a WLAN data packet 362 may be transmitted over the WLAN link, e.g., by transceiver 128 (FIG. 1), in response to a beacon packet 366, e.g., received from AP 110 (FIG. 1), during time period 364; and/or a polling request 388 may be transmitted over the WLAN link, e.g., by transceiver 128 (FIG. 1), in response to a beacon packet 382, e.g., transmitted by AP 110 (FIG. 1), during time period 376. WLAN data packets 384, e.g., including data packets buffered by AP 110 (FIG. 1) during time period 372, may be received over the WLAN link, e.g., by transceiver 128 (FIG. 1), during time period 376, for example, in response to polling request 388. Additionally or alternatively, one or more WLAN data packets 392 may be transmitted over the WLAN link, e.g., by transceiver 128 (FIG. 1). One or more Acknowledgment (ACK) packets 390 and 386 may be exchanged over the WLAN link, e.g., to acknowledge receipt of data packets 384 and 392, respectively. In some demonstrative embodiments, at least one of time periods 364 and 372 may be adjusted, e.g., by transceiver 128 (FIG. 1), based on any suitable criterion, e.g., as described above with reference to FIG. 3B.

In some demonstrative embodiments, scheme 360 may allow the transceiver to receive substantially all WLAN packets transmitted over the WLAN link, e.g., during both the WLAN and wireless-video time periods, e.g., time periods 364 and 372, while allowing the transceiver to respond to the WLAN packets received during the wireless-video time period. For example, one or more WLAN packets may be received over the WLAN link, e.g., by transceiver 128 (FIG. 1), during time period 372. For example, a packet 373, may be received during a time period 375 overlapping the transmission of video frame 370. Packet 373 may include any suitable WLAN packet, e.g., a beacon packet, a data packet, or a VoIP packet.

In some demonstrative embodiments, a portion 381 of frame 370 may be buffered during time period 375, e.g., to enable the transceiver to switch to the WLAN link. The length of time period 375 may be relatively short, e.g., 0.5 ms, compared to the length of time period 372. Accordingly, a relatively small buffer, for example, a buffer of less than 500 kB, e.g., less than 100 kB, may be required for buffering portion 381. Portion 381 may be transmitted over the wireless-video link, for example, at the end of time period 375.

Figure 4:
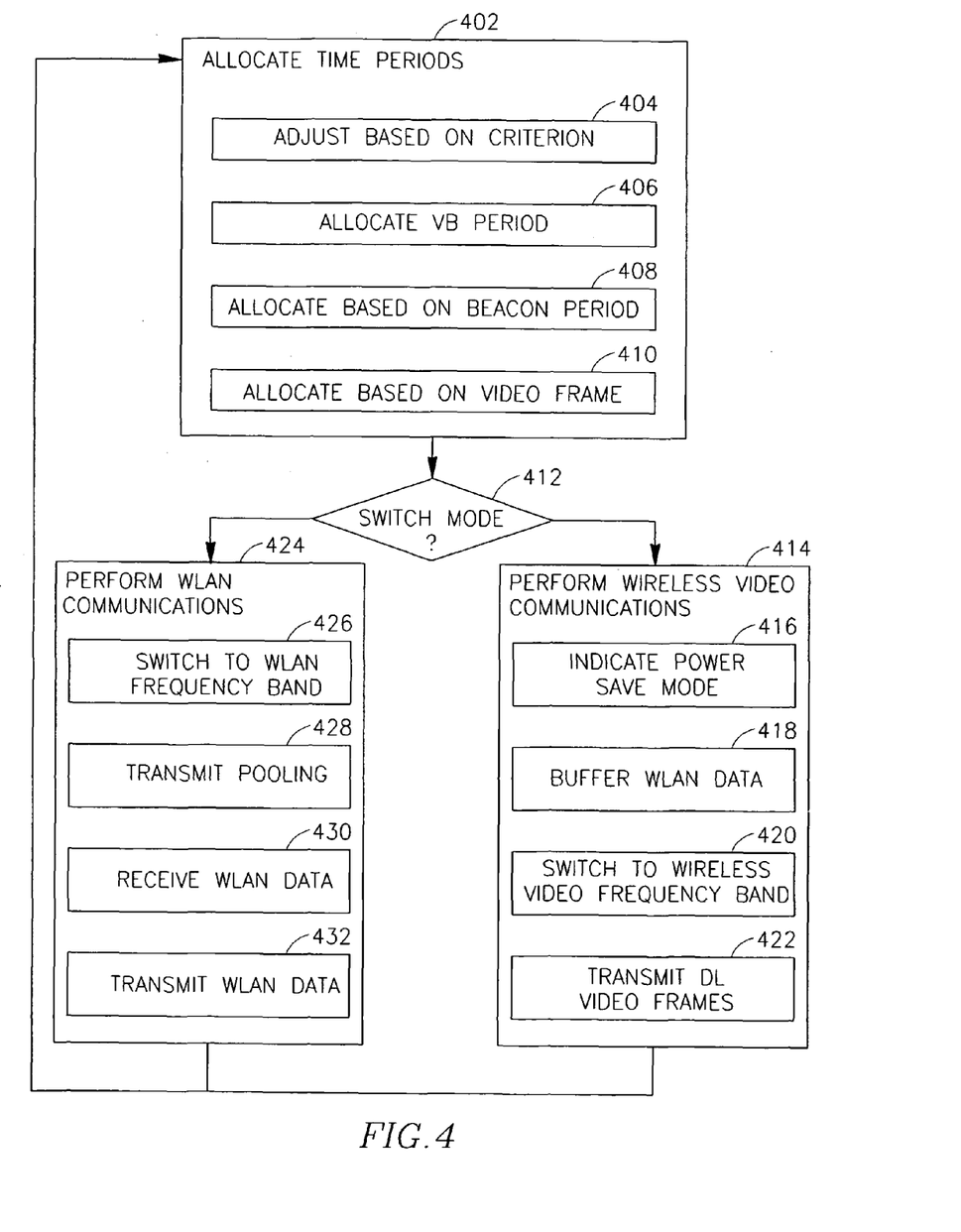
FIG. 4 is a schematic flow-chart illustration of a method of dual-mode wireless communication in accordance with some demonstrative embodiments.

Reference is made to FIG. 4, which schematically illustrates a method of dual-mode wireless communication in accordance with some demonstrative embodiments. Although embodiments of the invention are not limited in this respect, in some demonstrative embodiments one or more operations of the method of FIG. 4 may be implemented by a wireless communication system, e.g., system 100 (FIG. 1), and/or dual-mode transceiver, e.g., transceiver 128 (FIG. 1), and/or a dual-mode controller, e.g., controller 214 (FIG. 2), to perform WLAN communications over a WLAN communication link, and wireless-video communications over a wireless video link.

As indicated at block 402, the method may include allocating first and second time periods to be used for WLAN and wireless video communications. For example, transceiver 128 (FIG. 1) and/or controller 214 (FIG. 2) may allocate the WLAN and wireless video time periods according to a suitable wireless communication link allocation scheme, e.g., as described above with reference to FIGS. 3A, 3B and/or 3C.

As indicated at block 404, the method may include adjusting the first and/or second time periods based on a criterion. For example, transceiver 128 (FIG. 1) and/or controller 214 (FIG. 2) may adjust the WLAN and/or wireless-video time periods based on one or more parameters related to the WLAN communications and/or wireless-video communications, e.g., as described above.

As indicated at block 406, the method may include allocating the first time period during at least part of a VB period of the wireless-video communications. For example, transceiver 128 (FIG. 1) and/or controller 214 (FIG. 2) may allocate the WLAN time period during at least part of VB period 304 (FIG. 3A).

As indicated at block 408, the method may include allocating the first and/or second time periods based on a beacon period of the WLAN communications. For example, transceiver 128 (FIG. 1) and/or controller 214 (FIG. 2) may allocate the WLAN and/or wireless-video time periods in accordance with the allocation scheme described above with reference to FIGS. 3B and/or 3C.

As indicated at block 410, the method may include allocating the first and/or second time periods based on a length of a DL transmission of data representing a video frame over the wireless-video communication link. For example, transceiver 128 (FIG. 1) and/or controller 214 (FIG. 2) may allocate the WLAN and/or wireless-video time periods in accordance with the allocation scheme described above with reference to FIGS. 3B and/or 3C.

As indicated at block 412, the method may include automatically switching between first and second wireless communication modes of to perform the WLAN communications and the wireless-video communications, respectively. For example, transceiver 128 (FIG. 1) and/or controller 214 (FIG. 2) may switch between the first and second modes, e.g., as described above.

As indicated at block 414, the method may include performing wireless-video communications over the wireless-video link during the second time period. For example, transceiver 128 (FIG. 1) may perform wireless-video communications over wireless link 124 (FIG. 1) during the wireless-video time period, e.g., as described above.

As indicated at block 416, the method may include indicating to a WLAN AP a power save mode during at least part of the second time period. For example, transceiver 128 (FIG. 1) may indicate to AP 110 (FIG. 1) a power save mode during at least part of the wireless-video time period, e.g., as described above. In one example, WLAN BB 210 (FIG. 2) may operate at the power save mode during at least part of the wireless-video time period, e.g., as described above.

As indicated at block 418, the method may include buffering WLAN data to be transmitted over the WLAN link. For example, during the wireless-video time period, transceiver 128 (FIG. 1) may buffer WLAN data to be transmitted over the WLAN link, e.g., as described above.

As indicated at block 420, the method may include switching to a wireless-video frequency band to perform the wireless-video communications. For example, transceiver 128 (FIG. 1) may switch to the frequency band f2, e.g., before performing the wireless video communications, as described above.

As indicated at block 422, the method may include transmitting a DL transmission over the wireless-video link including video frames. For example, transceiver 128 (FIG. 1) may transmit the DL transmission over link 124 (FIG. 1), e.g., as described above.

As indicated at block 424, the method may include performing WLAN communications over the WLAN link during the first time period. For example, transceiver 128 (FIG. 1) may perform WLAN communications over wireless link 122 (FIG. 1) during the WLAN time period, e.g., as described above.

As indicated at block 426, the method may include switching to a WLAN frequency band to perform the WLAN communications. For example, transceiver 128 (FIG. 1) may switch to the frequency band f1, e.g., before performing the WLAN communications, as described above.

As indicated at block 428, the method may include transmitting a polling request over the WLAN link. For example, transceiver 128 (FIG. 1) may transmit to AP 110 (FIG. 1) a polling request over link 122 (FIG. 1), e.g., as described above.

As indicated at block 430, the method may include receiving WLAN data over the WLAN link. For example, transceiver 128 (FIG. 1) may receive from AP 110 (FIG. 1) WLAN data, e.g., including buffered WLAN data, in response for example, to the polling request, e.g., as described above.

As indicated at block 432, the method may include transmitting WLAN data over the WLAN link. For example, transceiver 128 (FIG. 1) may transmit to AP 110 (FIG. 1) WLAN data over WLAN link 122, e.g., as described above. The WLAN data may include, for example, WLAN data buffered by transceiver 128 (FIG. 1) during the wireless-video time period, e.g., as described above.

In some demonstrative embodiments, the first and second time periods may be re-allocated and/or adjusted, as indicated at block 402.

Some embodiments may be implemented by software, by hardware, or by any combination of software and/or hardware as may be suitable for specific applications or in accordance with specific design requirements. Some embodiments may include units and sub-units, which may be separate of each other or combined together, in whole or in part, and may be implemented using specific, multi-purpose or general processors, or devices as are known in the art. Some embodiments may include buffers, registers, storage units and/or memory units, for temporary or long-term storage of data and/or in order to facilitate the operation of a specific embodiment.

While certain features have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A dual-mode wireless transceiver comprising:
control circuitry for operating said transceiver in first and second wireless communication modes, wherein first communication mode is associated with said transceiver engaging in wireless communication with a wireless-local-area-network access point, and wherein second communication mode is associated with said transceiver engaging in wireless video communications over a wireless video communication link;
wherein upon said transceiver entering the second mode, said control circuitry further causes said transceiver to signal one or more wireless-local-area-network access points that said transceiver is unavailable to receive data while the transceiver is operating in the second mode, and
wherein during operation of said transceiver, said control circuitry further causes said transceiver to adjust the length of at least one engagement time period of the wireless communication modes based on a criterion related to at least one of the wireless-local-area-network communications and the wireless-video communications, and to further adjust a wireless-local-area- network communications engagement time period length to wireless-video communications engagement time period length ratio which is at least partially based on said criterion.

2. The transceiver of claim 1, wherein said control circuitry indicates to said wireless-local-area-network access point of a power-save mode during at least part of said transceiver's engagement in said second communication mode.

3. The transceiver of claim 1, wherein said communication with a wireless-local-area-network access point comprises establishment of a communication link over a first frequency band, and wherein said wireless video communication link comprises establishment of a communication link over a second frequency band different than said first frequency band.

4. The transceiver of claim 1 further comprising a radio-frequency module capable of performing said wireless-local-area-network communications and said wireless video communications; and
at least one base-band module capable of handling wireless-local-area-network signals of said wireless-localarea-network communications and wireless-video signals of said wireless-video communications.

5. The transceiver of claim 4, wherein said at least one base-band module comprises a wireless-local-area-network base-band module to handle said wireless-local-area-network signals; and a wireless-video base-band module to handle said wireless-video signals.

6. The transceiver of claim 5, wherein said wireless-local-area-network base-band module operates in a power-save mode during at least part of said transceiver's engagement in said second communication mode.

7. The transceiver of claim 1, wherein said control circuitry causes said transceiver to adjust at least one of the engagement time periods based on at least one of a throughput of said wireless-local-area-network communications and of a video format of said wireless video communications.

8. The transceiver of claim 1, wherein the first communication mode is at least partially during a vertical blanking period between transmission of two video frames in the second mode.

9. The transceiver of claim 1, wherein a combined duration of said first communication mode and of said second communication mode is divisible by a length of a beacon period of said wireless-local-area-network link.

10. The transceiver of claim 1, wherein a duration of the first communication mode is substantially equal to a duration of a downlink transmission of data representing a video frame over the wireless video communication link.

11. A system comprising:
a wireless data access point; and
at least one communication device including a dual-mode wireless transceiver comprising:
control circuitry for operating said transceiver in first and second wireless communication modes such that a first communication mode is associated with said transceiver engaging in wireless communication with a wireless-local-area-network access point, and such that the second communication mode is associated with said transceiver engaging in wireless video communications over a wireless video communication link, wherein upon said transceiver entering the second mode, said control circuitry causes said transceiver to signal one or more wireless-local-area-network access points that said transceiver is unavailable to receive data while the transceiver is operating in the second mode; and
wherein during operation of said transceiver, said control circuitry further causes said transceiver to adjust the length of at least one engagement time period of the wireless communication modes based on a criterion related to at least one of the wireless-local-area-network communications and the wireless-video communications, and to further adjust a wireless-local-area- network communications engagement time period length to wireless-video communications engagement time period length ratio which is at least partially based on said criterion.

12. The system of claim 11, wherein said transceiver comprises a wireless video receiver to receive wireless video transmissions from a wireless device over said wireless video communication link.

13. The system of claim 11, wherein said wireless-local-area-network link is a communication link over a first frequency band, and wherein said wireless video communication link is a communication link over a second frequency band different than said first frequency band.

14. The system of claim 11, wherein a combined duration of said first communication mode and of said second communication mode is divisible by a duration of a beacon period of the wireless-local-area-network link.

15. The system of claim 11, wherein the duration of the first communication mode includes at least part of a vertical blanking period between two video frames transmitted during the second mode.

16. A method comprising:
engaging in wireless-local-area-network communications between a transceiver and an access point over a wireless-local-area-network link during a first time period;
engaging in wireless video communications between the transceiver and a wireless video receiver over a wireless video communication link during a second time period; and
signaling one or more wireless-local-area-network access points that the transceiver is unavailable to receive data while the transceiver is engaged in wireless video communication,
wherein during operation of said transceiver, said control circuitry further causes said transceiver to adjust the length of at least the first and second time periods based on a criterion related to at least one of the wireless-local-area-network communications and the wireless-video communications, and to further adjust a wireless-local-area- network communications first time period length to wireless-video communications second time period length ratio which is at least partially based on said criterion.

* * * * *